(12) United States Patent
Le Van Suu

(10) Patent No.: US 6,263,324 B1
(45) Date of Patent: Jul. 17, 2001

(54) METHOD AND APPARATUS FOR THE USE OF A FUZZY LOGIC PROCESSOR IN A NETWORK

(75) Inventor: Maurice Le Van Suu, Savigny le Temple (FR)

(73) Assignee: SGS-Thomson Microelectronics S.A., Gentilly (FR)

(*) Notice: Subject to any disclaimer, the term of this patent is extended or adjusted under 35 U.S.C. 154(b) by 0 days.

(21) Appl. No.: 09/025,595

(22) Filed: Feb. 18, 1998

(30) Foreign Application Priority Data

Feb. 18, 1997 (FR) .................................................. 97 01897

(51) Int. Cl.$^7$ .................................................. G06F 15/18
(52) U.S. Cl. .................................... 706/1; 706/2; 706/15
(58) Field of Search .................................. 706/1, 3, 4, 10, 706/903, 2, 5–9, 15, 47

(56) References Cited

U.S. PATENT DOCUMENTS

| | | | |
|---|---|---|---|
| 5,261,036 | * 11/1993 | Nakano | 706/52 |
| 5,388,190 | * 2/1995 | Nakano | 706/52 |
| 5,400,435 | * 3/1995 | Nishimura | 706/4 |
| 5,485,550 | * 1/1996 | Dalton | 706/52 |
| 5,535,344 | 7/1996 | Le Van Suu | 710/129 |
| 5,537,651 | 7/1996 | Le Van Suu | 710/129 |
| 5,600,757 | * 2/1997 | Yamamoto et al. | 706/1 |
| 5,710,868 | * 1/1998 | Basehore | 706/4 |
| 5,796,918 | * 9/1998 | Menke | 706/1 |
| 5,809,234 | * 9/1998 | Le Van Suu | 709/230 |
| 5,809,486 | * 9/1998 | Cuce | 706/3 |
| 5,822,496 | * 10/1998 | Lee et al. | 706/7 |
| 5,845,275 | * 12/1998 | Le Van Suu | 706/1 |
| 6,061,672 | * 5/2000 | Caponetto et al. | 706/2 |

FOREIGN PATENT DOCUMENTS

| | | | |
|---|---|---|---|
| 0 513 829 A2 | * 11/1992 | (EP) | G06F/9/44 |
| 0 513 829 | 11/1992 | (EP) | G06F/9/44 |
| 0 729 255 | 8/1996 | (EP) | H04L/29/06 |

OTHER PUBLICATIONS

French Search Report from French Patent Application 97 01897, filed Feb. 18, 1997.

Garielli et al, "Design of a VLSI very high speed reconfigurable digital fuzzy processor", ACM pp 477–481, 1995.*

Cheng et al., "Design of a fuzzy traffic controller for ATM networks", IEEE, vol. 4, No. 1, pp 460–469, Jun. 1996.*

Kumbla et a;, "Implementation of fuzzy logic and neural networks control alogorithm using a digital signal processing chip", ACM pp 524–528, 1995.*

T.D. Ndousse, "Distributed Fuzzy Agents: A Framework for Intelligent Network Monitoring," ICC '97 Montreal, Towards the Knowledge Millenium, 1997 International Conference on Communications, vol. 2, pp. 867–871, Jun. 1997.*

* cited by examiner

Primary Examiner—Mark Powell
Assistant Examiner—Anil Khatri
(74) Attorney, Agent, or Firm—Wolf, Greenfield & Sacks, P.C.; James H. Morris; Theodore E. Galanthay

(57) ABSTRACT

A fuzzy logic processor placed in a home automation communications network manages messages traveling through the network. To manage the messages, the fuzzy logic processor works in two stages. In a first stage, on a first part of the message, the fuzzy logic processor ascertains that the message is addressed to it, according to rules by which it recognizes that it is the addressee. Once it recognizes that it is the addressee, it is also capable of producing a routing command because the address of the sender of the signal is present in the message. This routing command is applied to a multiplexer located at the input, interfacing between the fuzzy logic processor and the network in order to route data elements, constituting another part of the message, to the appropriate input of the fuzzy logic processor.

20 Claims, 2 Drawing Sheets

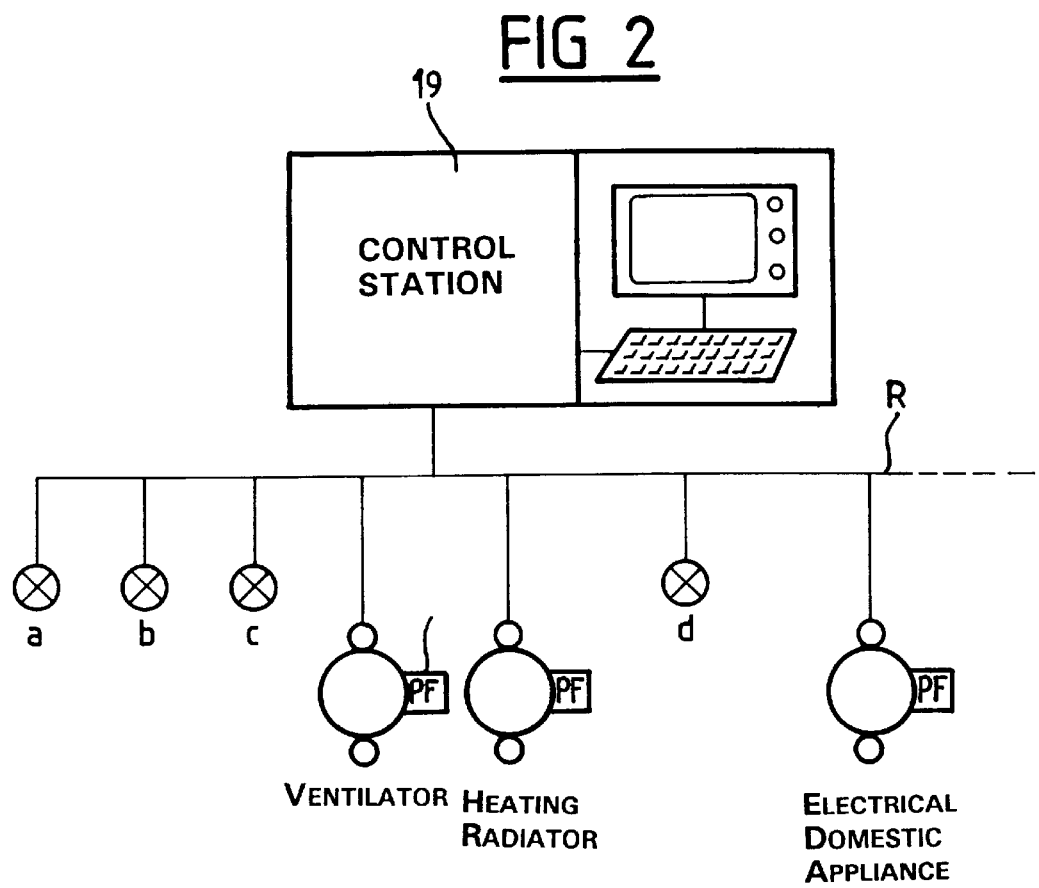
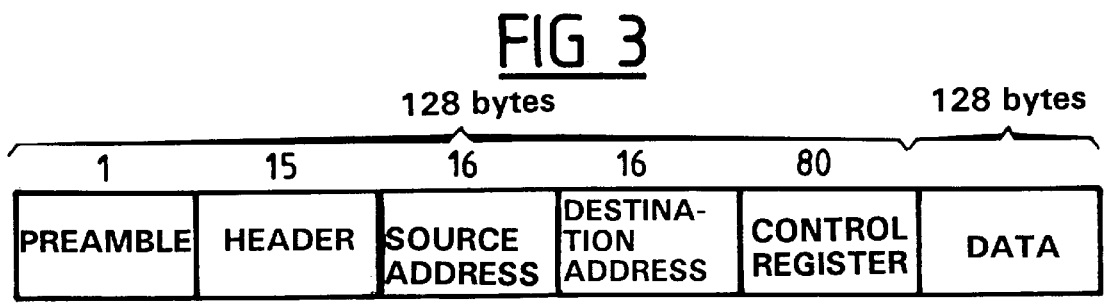

METHOD AND APPARATUS FOR THE USE OF A FUZZY LOGIC PROCESSOR IN A NETWORK

BACKGROUND OF THE INVENTION

1. Field of the Invention

An object of the present invention is a method and apparatus for the use, in a network, of a fuzzy logic processor as well as a fuzzy logic processor. The invention is aimed at simplifying the relationship among fuzzy logic processors whose use in local mode is known, with network distributed devices of great utility.

2. Discussion of the Related Art

In a system including network-distributed devices, it is possible to consider each of the devices connected to this system as a resource (an actuator) or as a source of usable information. In the field of home automation systems, different types of networks are known. In particular, these are the systems called HS (HOME SYSTEM) Batibus, CAN etc. The principle of operation of these networks lies in the use of a protocol. Each message that is transmitted on the network has a preamble, a header, a source address, a destination address, a control register, data elements and an acknowledgment or an error correction field.

The preamble generally has an indicator representing the beginning of the message. This indicator, which is used most importantly for synchronization and is known as "START", may take a variety of forms. For example, in a four-wire bus where two wires are used for the transmission of the data and two other wires are used for the transmission of a clock and electrical supply signal, an indicator START is detected by a transition on the two data wires when the clock is at a low level. In carrier current circuits, it may be a signal at a typical modulation frequency. Other conventions are applicable for the different networks.

By way of example, FIG. 3 shows an exemplary message sent on a network. In the arbitrary example shown, the message will have a 256-byte frame. In these 256 bytes, 128 first bytes correspond to a logistical part of the message. It is however possible to define a protocol that consumes fewer bytes, with for example only eleven bytes. As shown in FIG. 3, there is one byte for the preamble, 15 bytes for the header, 16 bytes for the source address and for the destination address and 80 bytes for the control register. It is possible to have only one byte for the header and the addresses and even any intermediate length or a length greater than the 1–15 byte interval. The 128 other bytes are used to transmit data elements.

FIG. 2 gives a schematic view of a network R in which three actuator devices, one ventilator, one heating radiator and one electrical domestic appliance, are connected to the network. Furthermore, detectors or control buttons a to d are connected to the network R. The network R may be of the twisted pair, carrier current, infrared, radioelectrical or other type.

Since all of the devices are connected to the same network R, it is necessary to provide each of them with an interface capable of interpreting the logistical bytes to extract data bytes so that their processing is done. U.S. Pat. Nos. 5,537,651 and 5,535,344 describe interface circuits that have to be fitted into each device, especially the actuator devices, such as the ventilator, the heating radiator and the domestic electrical appliance in order to make them understand the messages that are transmitted on the network R.

A known interface uses a local sequencer to control routing operations in the network by reading received messages. The problem of this technique is the cost and complexity of the required processor. Indeed, the extent to which a fuzzy logic processor is capable of managing complex situations at little cost depends on the extent to which it can receive, in a simple way, the data that it has to process. To simplify matters, a fuzzy logic processor currently available on the market, for example W A R P 1, W A R P 2 or W A R P 3, by SGS-THOMSON MICROELECTRONICS, has at least eight inputs for the data elements and two outputs for the commands, all for a price of less than 10 francs, namely 2 dollars. The making of an interface such as the one described in the above-mentioned patent applications has a cost of the same order. This means that making a fuzzy logic processor which can be used in a network presently costs twice as much as it should. Furthermore, it is complex to develop.

In an embodiment of the present invention, this problem of cost and complexity will be resolved through the use of a fuzzy logic processor to perform the functions of the local sequencer. The local sequencer must in practice be a processor. A fuzzy logic processor is not normally designed, by virtue of its specific operation, to behave like a normal processor. This specific feature shall be explained further below. It may be recalled that a normal processor has a register of instructions and one or more data input/output registers. The processor consists of an arrangement of logic gates that receive these data elements as input. These gates are validated as a function of an instruction code present in the instruction register. An operation of this kind is not available as such in a fuzzy logic processor.

SUMMARY OF THE INVENTION

In the present invention, by using a particular configuration, it is possible to use a fuzzy logic processor to extract the data elements that must then be processed by the fuzzy logic processor itself. In an embodiment of the present invention, the fuzzy logic processor works in two stages. In a first stage, it receives the message and processes it to extract data. In a second stage, the extracted data elements are introduced to the inputs of the fuzzy logic processor so that the known fuzzy logic processing is applied to them.

An object of the invention therefore is a method for the use, in a network, of a fuzzy logic processor including steps in which processing rules are recorded in a rules memory in the fuzzy logic processor, and these rules are applied for the processing of data elements present at the inputs of the fuzzy logic processor. The method further includes recording reading rules in the rules memory of the fuzzy logic processor to enable reading messages transmitted by the network, and when a message is detected on the network, decapsulating the message with the reading rules. Then, data elements present in the message are introduced into processing inputs of the fuzzy logic processor.

An object of the invention is also a fuzzy logic processor including processing rules in a rules memory, data input circuits and circuits to apply these rules in processing mode to data elements presented to the input circuits and to produce decision signals. The fuzzy logic processor further includes an interface interposed between these input circuits and a network, and reading rules recorded in the rules memory to read messages transmitted by the network. The fuzzy logic processor includes circuits designed, at a first stage, to apply the reading rules to a transmitted message in order to read it, decapsulate it and control the input circuits accordingly, and circuits designed for the processing, in a second stage, of the data elements present in the input circuits.

BRIEF DESCRIPTION OF THE DRAWINGS

The invention will be understood more clearly from the following description and the appended figures. These figures are given purely by way of example and in no way restrict the scope of the invention. Of these figures:

FIG. 2, shows a schematic view of a home automation network connecting actuators to detection devices; and FIG. 3 shows a symbolic view of a message transmitted on the network of FIG. 2.

DETAILED DESCRIPTION

Figure 1:
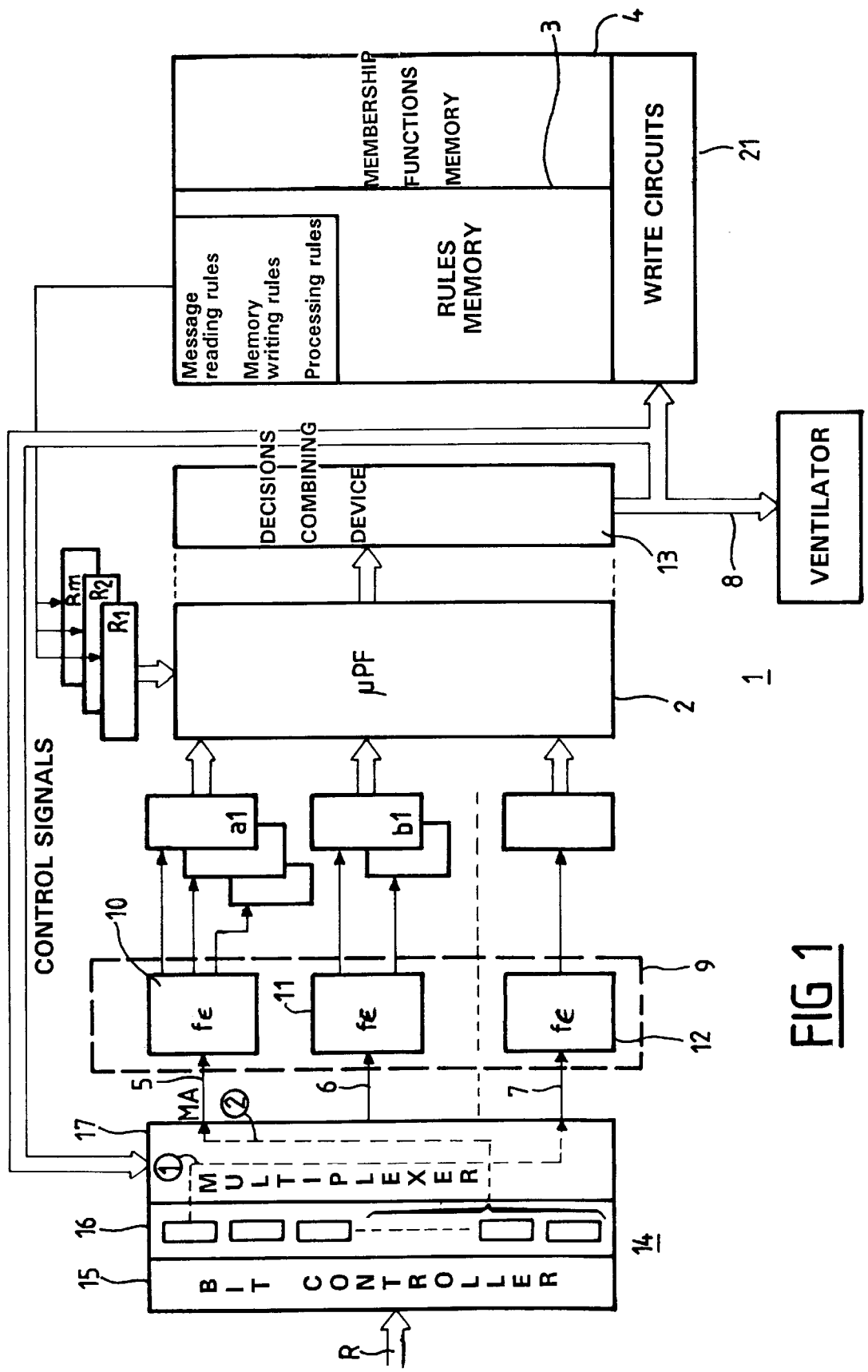
FIG. 1 shows a fuzzy logic processor according to an embodiment of the present invention provided with a two-stage control circuit.

FIG. 1 shows a fuzzy logic processor 100 according to an embodiment of the present invention. The fuzzy logic processor 100 has a logic processing unit 2, specifically adapted to the processing of the fuzzy logic operations. It furthermore comprises a rules memory 3 as well as a membership functions memory 4. It has at least inputs 5 to 7 to receive data elements from network R to be processed. In the examples referred to, the known processors may have 12, 10 or 8 distinct inputs. Once the processing is done, the logic unit 2 produces decision signals available at a bus 8. The bus 8 is, for example, directly connected to a device to be controlled, for example the ventilator of FIG. 2.

A highly simplified explanation shall now be given of the operation of a fuzzy logic processor to illustrate how this operation is used in a particular configuration of a network connection of this fuzzy logic processor.

A data element to be processed, for example a temperature tA in a room A (not shown), may be measured and converted into a signal MA. The signal MA is introduced to one of the inputs, the input 5, of the fuzzy logic processor 1. The connection is direct (fixed) in the prior art.

In the membership functions memory 4, there are sets of correspondence tables. For example, there are five correspondence tables for the temperature in the room A. According to these five tables, this temperature tA shall be considered to be very cold, cold, normal, hot or very hot with a likelihood quantified between 0 and 1. One of these five tables, for example the normal table, will comprise a correspondence with a likelihood of 1 (normal temperature) if the value tA is a temperature ranging from 19° to 21°. Between 16° and 19°, and between 24° and 21°, the likelihood will change from 0 to 1. Below and above these values, it will be assumed that the temperature is not normal: the likelihood coefficient at the normal temperature will be zero. Consequently, for the value MA of temperature measured in the room A, the five membership function tables referred to here above will give five values. It is enough to prompt five readings of the five different tables to know the five membership coefficients.

This operation for the multiple reading of tables is represented schematically in FIG. 1 by a unit 9. It is specific for a fuzzy logic processor. The unit 9 which, in practice, is a read circuit has sub-circuits 10 to 12 for the reading of the batch of tables, namely the batch of the membership functions $f\epsilon$ corresponding to the data elements that are introduced at the inputs 5 to 7. According to what has just been stated, the introduction of the signal MA into the unit 9 will automatically prompt the devising of five membership coefficients a1, a2,–a5, one coefficient for each membership function. This may also be the case for another signal from another sensor located in another room: the room B (not shown). The corresponding coefficients a1–a5, b1–b5 are introduced by the data inputs of the logic unit 2. This automatic operation is one of the modes standard of operation of a fuzzy logic processor. The last introduction can be compared for its part to the introduction of the data elements into a data register of a standard processor.

An example of the type of rules stored in the rules memory is: if MA belongs to the membership function 1 and if MB belongs to the membership function 1 and if . . . , then the decision to be produced will be equal to . . .

There are several rules of this type that are recorded in the memory 3. At the time of the processing, the unit 2 reviews all the rules and takes them into account. For example, when the temperature in the room A is normal, its coefficient of membership in the membership function "very cold" will be zero: a1 will be zero (consequently all the rules implicated by a1 will be set aside). The other rules, those implicated by the membership coefficients different from 0, will lead to elementary decision signals. The elementary decision signals are generally included in the rules themselves. In a device 13 for combining the decisions, the elementary decisions are combined with one another to produce the signal that is set up on the bus 8. The reviewing of all the rules and the working out of the decisions is another typical (and unchanging) type of operation of a fuzzy logic processor.

A most common combination includes taking the mean of the elementary decision signals prepared for all the rules that have been affected. The reviewing of all the rules amounts to the simultaneous or successive loading of all the rules R1, R2, . . . , Rm contained in the memory 3 into the "instruction register" of the fuzzy logic processor 100. It will be further noted that the structure of the logic gates of the circuit 2 is quite different from a standard structure owing to the devising of the elementary decision signals, which requires specific operations. This is a summary explanation but provides an understanding of the specialized operation of a fuzzy logic processor.

In an embodiment of the present invention, to enable the connection of the inputs 5 to 7 of a fuzzy logic processor 100 to the network R, a multiplexer 14 is interposed. In one example, this multiplexer 14 includes a bit controller circuit 15 and a set 16 of registers to store all or part of the bytes of a received message, for example all the bytes of the message shown in FIG. 3. The bit controller 15 forms the interface between the network R and the registers 16. It has all the necessary demodulators. The multiplexer 14 furthermore has a routing circuit 17 whose role is to place appropriate data elements at the inputs 5 to 7 of the processor 100. The inputs 5 to 7 are represented as single wires, but may also be buses, and it is possible for the link to be a parallel instead of a serial link.

In an embodiment of the present invention, the control bus 8 that conveys the decision signals is diverted in order to be applied to a control input of the routing circuit 17.

The principle of the invention then is the following. The message received and stored in the registers 16 is processed in two stages. A first part of the message is sent on a special input (this means an input designed for this purpose) of the fuzzy logic processor 100. The special inputs include at least inputs 5 to 7 and may include at least five other inputs. These inputs receive signals from bus R. For example, this input could be the eighth (or first) input of the eight available inputs of a fuzzy logic processor 100. The way in which this step can be circumvented shall be described below.

In practice, instead of using a special input, four of them will be used as follows. A first level of encoding, in practice a first byte which corresponds to a preamble, is introduced at a first special input. The following encoding levels, in practice bytes 16 to 32 which represent a source address, are introduced at a second special input. The encoding levels or bytes 33 to 48 which represent destination addresses are applied to a third special input and the encoding levels or bytes 49 to 128 representing the control register are applied to the fourth special input.

As a variant, there are no special inputs dedicated definitively to the processing of the logistical part of the message (the first 128 bytes) but a processing operation performed at a first stage for example, by the first four inputs, the first four inputs thereafter resuming normal operation.

A preamble signal normally has a string of four zeros followed by 1010. This signal is used to synchronize the system, especially the bit controller 15. The numerical expression of this signal is 10. In an embodiment of the present invention, this preamble signal will be processed such that, if the signal received at the first special input ranges from 0 to 32, then it is a transmission. If the signal is 10, the transmission of a message on the network is detected. For the signal transmitted at the second special input, if its value ranges from 0 to 32, it is determined that it is the sensor A that is sending its temperature. If this value ranges from 33 to 64, it is the sensor B. If it ranges from 65 to 96, it is the sensor C and so on and so forth. Furthermore, if the signal value ranges from 222 to 256, it is determined that there is a control station 19 (FIG. 2) that is taking control of the system.

In the third special input, the destination address is introduced. In the rules, if it is ascertained that the value is for example, a value ranging from 128 to 152 representing the ventilator, then in this case the fuzzy logic processor 20 attached to the ventilator is concerned. At the fourth special input, the signal corresponding to the control register is introduced. It is chosen by convention that if this signal is, for example, smaller than 64, the following data element (the following 128 bytes) represent a measurement. It shall be seen further below that if this value is greater than 64, the following data element will have to be interpreted as a direct decision.

In other words, the processing unit 9 or the part of the sub-circuits 10 to 12 related to the special inputs subjected to an operation give rise to table reading operations and set up the corresponding membership functions at inputs of the arithmetic unit 2. A particular feature of the invention is, at the beginning, the fact that the tables and rules implied are tables and rules for the reading of a message of the protocol.

Since this is a message sent by the detector A on the network, this message, prepared by the detector A, includes the address of the ventilator and of its associated fuzzy logic processor 20 as a destination address. Consequently, the fuzzy logic processor 20, by its first special input, will ascertain that it is a transmission. By its second special input it will ascertain that it is the detector A that is involved. By its third special input, it will ascertain that it is directly concerned and by its fourth special input it will ascertain that the measurement data element to be taken into consideration is located in the 128 end-of-message bytes. Thus, the first command devised by the decision circuit 13 is a command directly applied to the control inputs of the routing circuit 17 so that the 128 useful message data bytes are then applied to the input 5 of the processor 100. The two steps are referenced respectively with a ① and ② in the circuit 17. In the first step, the first bytes of the register 16 are applied to the special (or temporarily special) inputs. In the second stage, the data element is processed. If detector B is involved, the input 6 would be chosen.

Rather than defining a special input, it may be decided that the circuits 10 and 11, which normally have the task of processing signals coming from the sensors A and B (namely with readings of tables designated in the memory 4), should work in two stages. In a first stage, they would read tables corresponding to the determining of the membership functions of the different logistical parts of the message so as to identify the addressee of the measured data element.

The elementary decision signal of a rule of the "if-then" type may then be computed by the circuit 13 by means of an average. It may also be determined by the rule itself. Thus, if the membership coefficients pertaining to the situation described above are all equal to 1, the result may be the passage on the bus 8 of a control word that can be understood by the circuit 17 alone, to set the parameters of the circuit 17. The control word comprises, firstly, the address of the multiplexer 14 and, secondly, the electrical states capable of routing the registers 16 to the input 5.

Another way of operating would consist in seeking to dictate an obligatory operation from a control station 19. In this case, the message shown in FIG. 3 comprises, as a source address, a value capable of making the fuzzy logic processor 100 recognize the source of the message as being the control station 19. The value present in the control register, for example greater than 64, then indicates that the data elements shown in the rest of the message (the 128 following bytes) have to be applied as such, by way of a command, to the control bus 8 of the processor 100. This would have the result of prompting a set mode.

Next, a description of how this set mode is prompted and, secondly, how it can be used to modify the rules memory or the membership functions memory by prompting the action of circuits 21 for the programming of the memories 3 or 4 connected to the bus 8. In general, a fuzzy logic processor does not have write circuits. In an embodiment of the present invention, the fuzzy logic processor includes write circuits. The write circuits 21 are furthermore controlled by the processor 100 by means of the unit 2 and the circuit 13 which are connected to the write circuits 21 by bus 8.

A simple way of carrying out the transfer of a data element accepted at an input as a decision signal includes in setting up rules of the following type:

"if data element x at input then decision=x".

Thus these rules may, in a simple example using one four-bit control word, be equivalent to sixteen rules of the following type:

if 0000 then 0000 if 0001 then 0001 if 0010 then 0010 and so on and so forth. A set of special rules is planned for this purpose.

Thus, in the rules memory 3, there are processing rules (this is the standard case), there are message reading rules (this is what has been seen here above), and there are furthermore memory writing rules 3 or 4. These rules are loaded into the processing unit 2 when, by processing with the reading rules, it is acknowledged that the operation is a writing operation. It is acknowledged that it is a writing operation if the value loaded into the control register zone is adequate.

In this way, a data element may be transcribed and executed as such. The data elements of the 128 remaining bytes may be such that they include the address of the write circuit, the electrical states to bias this write circuit in write mode, and the addresses and the data elements to be recorded in the rules memory itself. For example, if a control word useful for the writing has a particular configuration X (with n bits), a rule will be created "if data X at input then output equals X", and a membership function will be created, with the value of X at input, with a coefficient of likelihood equal to 1 (or else 0).

Thus, in one example, the coefficient of membership of the data element 0000 in the membership function 0000 is 1. Hence, when the data element 0000 is present at the input, the membership function 0000 delivers a signal 1 and the relevant rule, which states that "if membership function 1=1 then output command equals 0000", produces a command signal 0000. This is the desired write signal.

When the signal contained in the control register zone implies immediate execution in set mode, it is furthermore possible to plan for the use, on the basis of the rules memory 3, of a set of particular rules without having to review them all. It is thus possible to provide for classes of rules that are different depending on whether it is sought to process a data element, decapsulate a message, write in the memory or set the functioning of an actuator, the ventilator, or on the contrary prompt a storage of new rules or new membership functions in the memory 3 or 4 or any other memory.

Thus, permanent setting is obtained by modifying the rules while temporary setting is obtained by the immediate execution of a decision that is itself transmitted in the message. This may be obtained with a rule of the type: "if data element belongs to the function Y, then the decision is equal to the value contained in the register that contains the data element".

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A fuzzy logic processor comprising processing rules in a rules memory, data input circuits and circuits to apply the processing rules in processing mode to data elements presented to the input circuits and to produce decision signals, wherein the fuzzy logic processor further includes:
   an interface interposed between the input circuits and a network;
   reading rules recorded in the rules memory to control the reading of messages transmitted by the network;
   circuits designed for applying in a first stage, the reading rules to a transmitted message in order to read it, decapsulate it and control the input circuits accordingly; and
   circuits designed for processing, in a second stage, the data elements present in the input circuits to write rules in the rules memory.

2. A processor according to claim 1, wherein the interface has a multiplexer controlled by the fuzzy logic processor.

3. A processor according to claim 2, wherein the multiplexer has a bit controller and a set of registers to record the message received and processed by the bit controller.

4. A processor according to claim 1 wherein the interface includes a multiplexer.

5. A processor according to claim 4 wherein the multiplexer includes a bit controller.

6. A processor according to claim 5 wherein said interface also includes a set of registers to record the message received and processed by the bit controller.

7. A processor according to claim 1 wherein said circuits designed for processing include a logic processing unit.

8. A processor according to claim 1 wherein the interface includes a logic processing unit and a decisions combining device coupled from said logic processing unit.

9. A processor according to claim 1, wherein said circuits for processing include a logic processing unit, and further including a decisions combining device coupled from said logic processing unit.

10. A processor according to claim 9, further including a bus, and a device to be controlled, said bus for providing signals from said decisions combining device to said device to be controlled.

11. A processor according to claim 10, wherein said bus also connects to write circuits associated with said rules memory.

12. A processor according to claim 11, wherein said bus also connects to said interface to control data input circuits.

13. A method for using a fuzzy logic processor comprising the steps of:
   recording processing rules in a rules memory of the fuzzy logic processor;
   recording reading rules in the rules memory to read messages transmitted by a network;
   receiving a message transmitted by the network;
   processing the message under control of the reading rules to extract data;
   routing data from the message to inputs of the fuzzy logic processor; and
   applying fuzzy logic processing to the data by applying a decision that is transmitted in the message.

14. A method according to claim 13, further including:
   modifying the rules memory with circuits to write rules in the rules memory.

15. A method according to claim 13, further including:
   routing messages from the network through a multiplexer to the fuzzy logic processor; and
   applying a control signal from the fuzzy logic processor to the multiplexer.

16. A method according to claim 13, further including:
   defining a set of rules for each function performed by the fuzzy logic processor; and
   executing the rules as a set depending on a control signal operated on by the fuzzy logic processor.

17. A method according to claim 13 wherein, when a message is detected on the network, decapsulating the message with the reading rules, and introducing data elements present in the message into processing inputs of the fuzzy logic processor.

18. A method according to claim 13 including applying the processing rules for processing the data elements presented to inputs of the fuzzy logic processor.

19. A method according to claim 13 further including routing messages from the network through a multiplexer to the fuzzy logic processor.

20. A method according to claim 13 further including defining a set of rules for each function performed by the fuzzy logic processor.

* * * * *